A. & C. D. Smedley,
Washing Machine,
N° 43,610.
Patented July. 19, 1864.

Witnesses
John K. Belser
R. C. Nelson

Inventor:
Anderson Smedley
Clement D. Smedley

UNITED STATES PATENT OFFICE.

ANDERSON SMEDLEY AND CLEMENT D. SMEDLEY, OF CARTHAGE, OHIO.

IMPROVED WASHING-MACHINE.

Specification forming part of Letters Patent No. 43,610, dated July 19, 1864.

*To all whom it may concern:*

Be it known that we, A. SMEDLEY and C. D. SMEDLEY, of Carthage, in the county of Hamilton, State of Ohio, have invented a new and useful Washing-Machine; and we do hereby declare that the following is a full, clear, and exact description of the construction and operation of the same, reference being had to the annexed drawings, making a part of this specification, in which—

Figure 1:
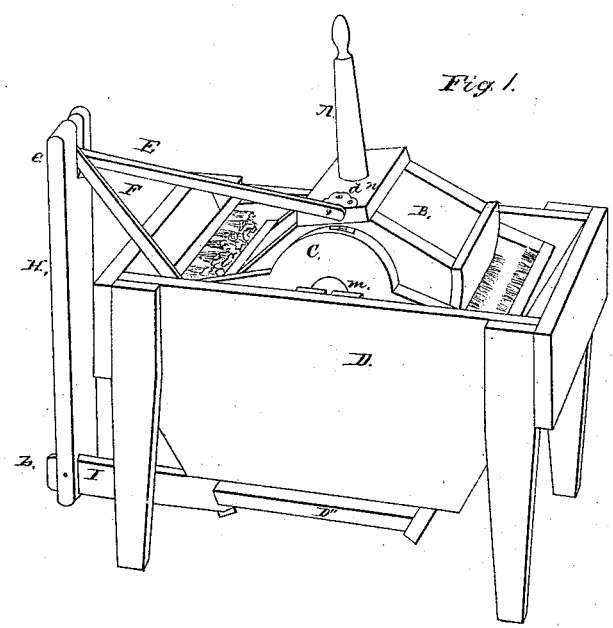
Figure 2:
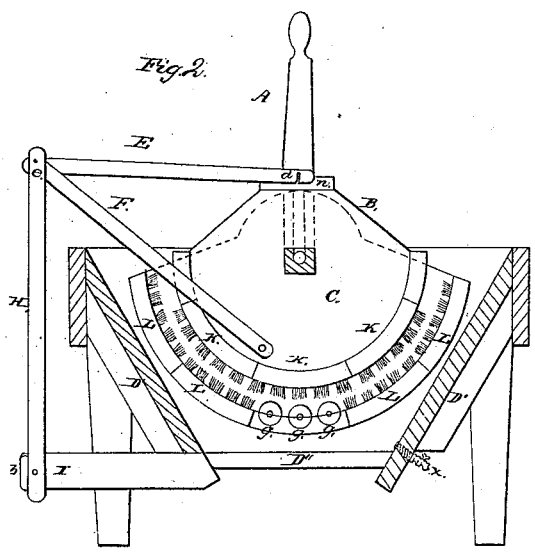
Figure 3:
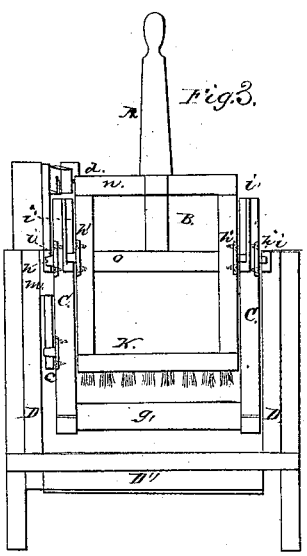

Figure 1 is a perspective view; Fig. 2, a longitudinal elevation; Fig. 3, a transverse section.

We make the suds-box D with beveled ends D' D', as shown in Fig. 2, and bottom D'', as shown in Figs. 2 and 3. On one side is placed the slot-block $m$ to give room for the cam-rod F and pivot $c$, as shown in Fig. 3. In slot-block $m$ is set slot $i$. The other slot $i$ is set in the side, as shown in Fig. 3.

We make the clothes-box G as shown in Fig. 2, the brushes L L L L showing the shape of the lower part, and dotted lines the upper part. We put in the bottom three rollers, $g$ $g$ $g$, on each side of which and around the circumference are placed the brushes L L L L, made with the brush on the inside, as shown. In center of the side from which the circle is struck are placed the pivots $h$ $h$, as shown in Fig. 3, which drop into the slots $i$ $i$, as shown, thus making a swinging clothes-box. On the inside of the clothes-box are placed the slots $i'$ $i'$, as shown in Fig. 3. On the side under the slot-block is put pivot $c$, as shown in Figs. 2 and 3.

We make the rubber B as shown in Figs. 1, 2, and 3, the brushes K K K showing the shape of the bottom, and the black lines the upper part. On the sides of the rubber are placed the pivots $h'$ $h'$, which drop into the slots $i'$ $i'$, as shown. The pieces $n$ and $o$, as shown, are for securing the lever or handle A to the rubber. It is put in with a round tenon, as shown in Fig. 3. On the piece $n$ is put the pivot $d$, as shown. The arm I passes loose through a mortise in the upright H, and is secured to it by the loose bolt $b$. In the upper end of the upright H is another mortise through which the cam-rods E and F pass, and are secured by a loose bolt, $e$. The cam-rod E is made with a hook on one end to drop on pivot $d$, as shown in Figs. 2 and 3. The cam-rod F is attached to pivot $c$, as shown in Figs. 2 and 3. $x$ is a stop-cock to draw off the water from the suds-box D.

Having raised the end of the cam-rod E off of the pivot $d$ and lifted the rubber B from its position in the clothes-box C, and having water of the usual temperature for washing in the suds-box D, soap the clothes to be washed and put into the clothes-box C sufficient to keep the rubber from resting by the pivots on the lower end of the slots $i'$ $i'$, so that the weight of the rubber shall rest on the clothes, replace the rubber and cam-rod, take hold of the handle A, and move it right and left. When we move the handle A to the right, the brushes K K K are moved to the left, at the same time the brushes L L L L, by the action of the cam rods E and F on the clothes-box C, are carried to the right, each set of brushes K K K and L L L L describing the segment of a circle and not moving in a plane. Reversing the motion of the handle A, we reverse the above-described movements, so that we have the brushes L L L L and K K K moving simultaneously in opposite directions. The rollers $g$ $g$ $g$ serve to turn and change the position of the clothes while they are being brushed or washed, the construction and operation being for the more speedy and better washing of clothes.

What we claim, and desire to secure by Letters Patent, is—

The form, arrangement, and use of the brushes K K K and L L L L, when they are formed, arranged, and used in the manner and for the purpose specified.

ANDERSON SMEDLEY.
CLEMENT D. SMEDLEY.

Witnesses:
F. H. ROWEKAMP,
ANTHONY BUNING.